C. W. BORG.
FEED AND PRESSURE MECHANISM FOR WOODWORKING MACHINES.
APPLICATION FILED JAN. 23, 1907.
1,038,483.
Patented Sept. 10, 1912.
4 SHEETS—SHEET 1.
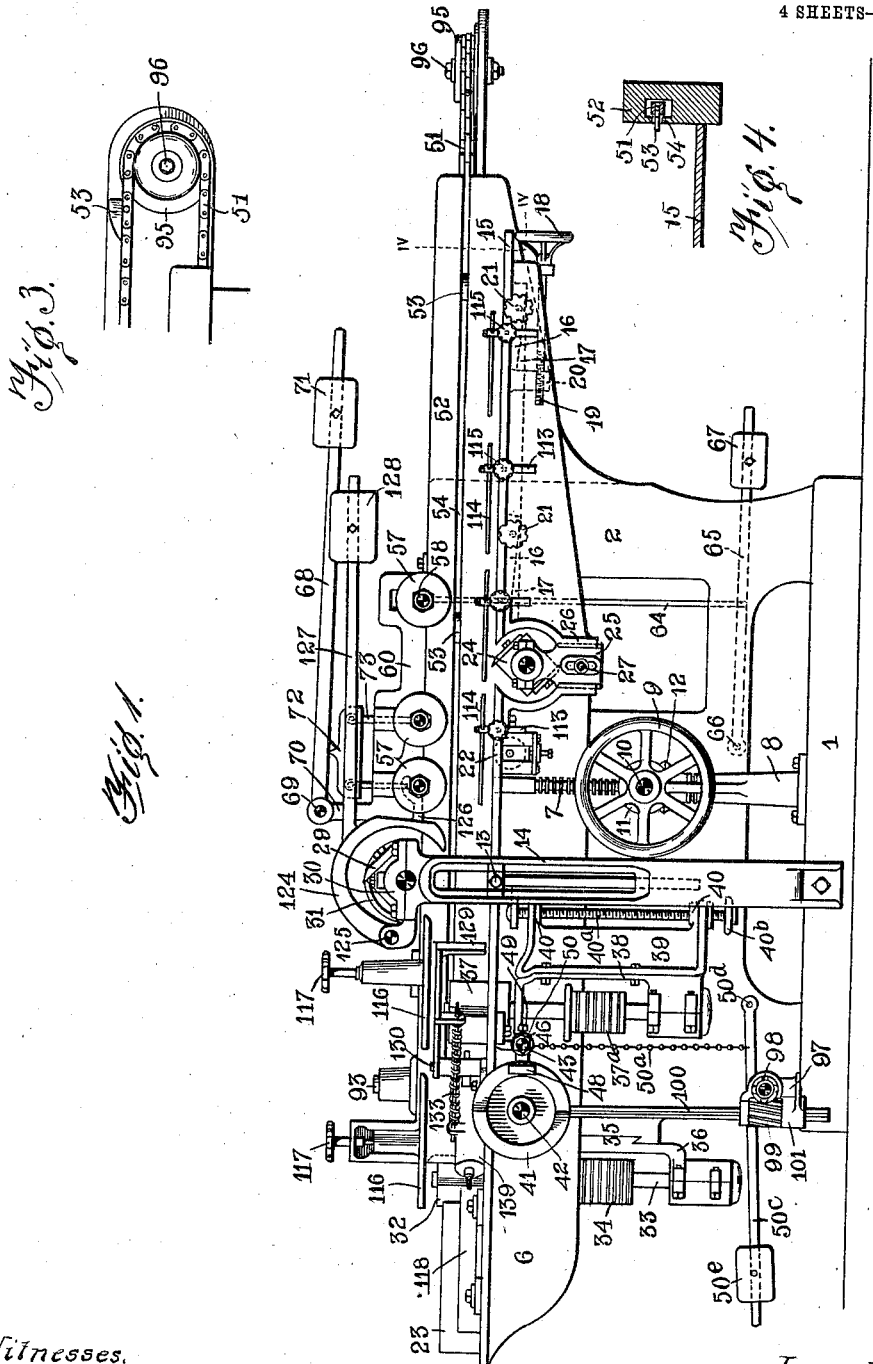

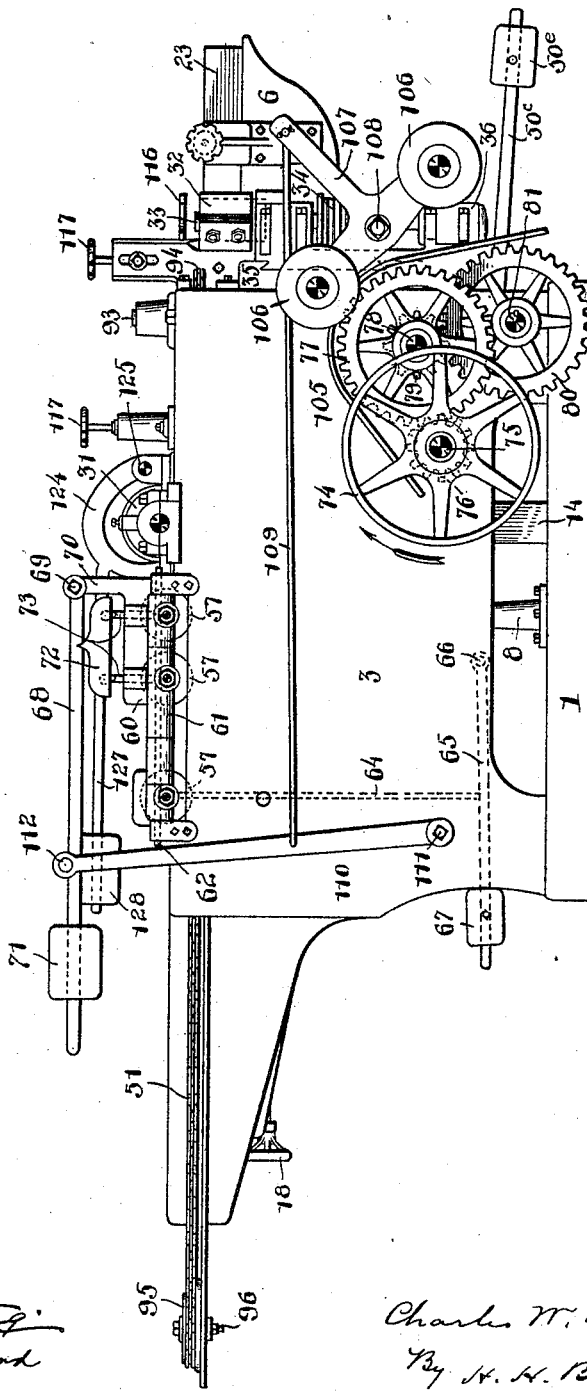

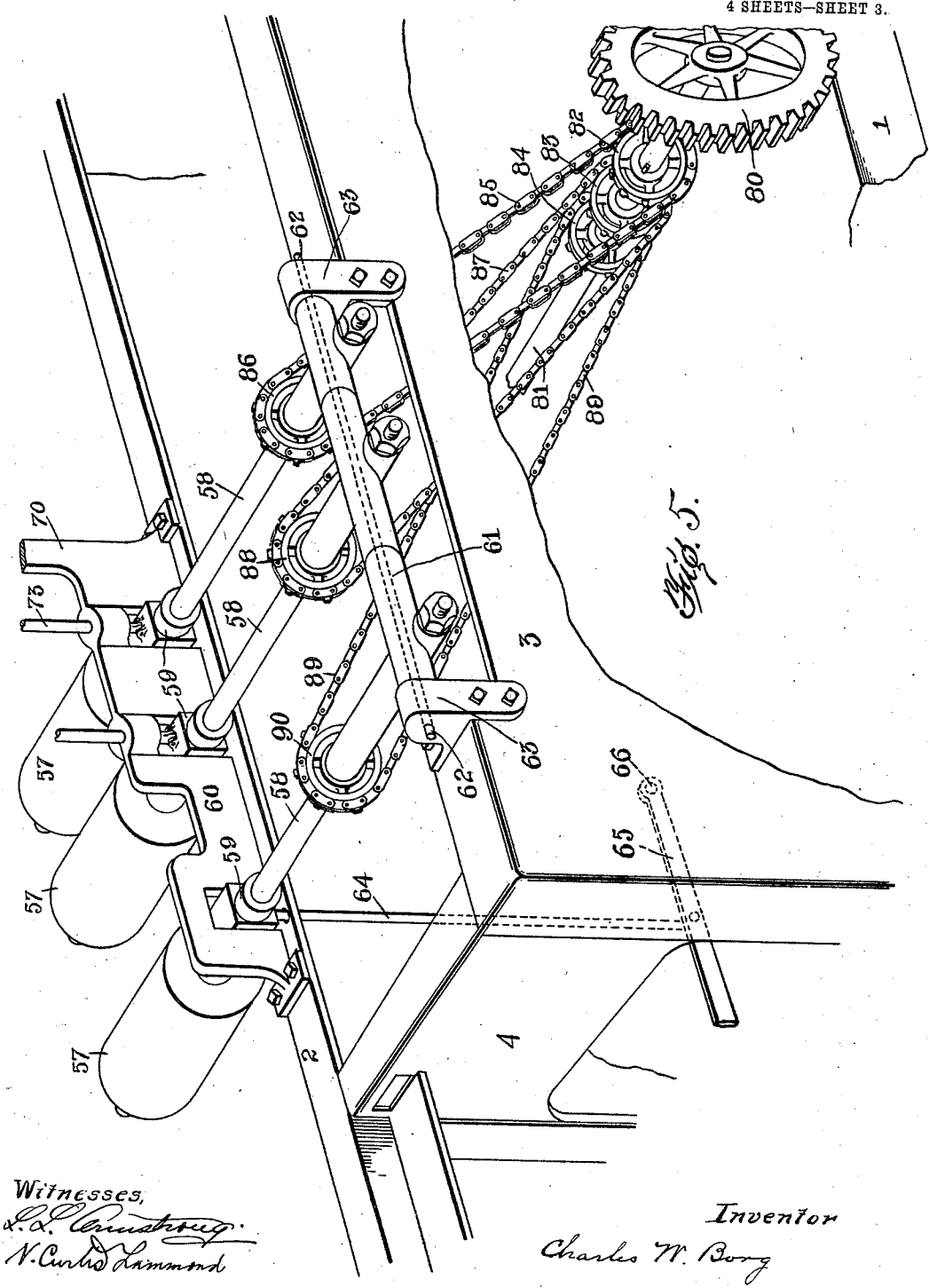

C. W. BORG.
FEED AND PRESSURE MECHANISM FOR WOODWORKING MACHINES.
APPLICATION FILED JAN. 23, 1907.
1,038,483.
Patented Sept. 10, 1912.
4 SHEETS—SHEET 4.
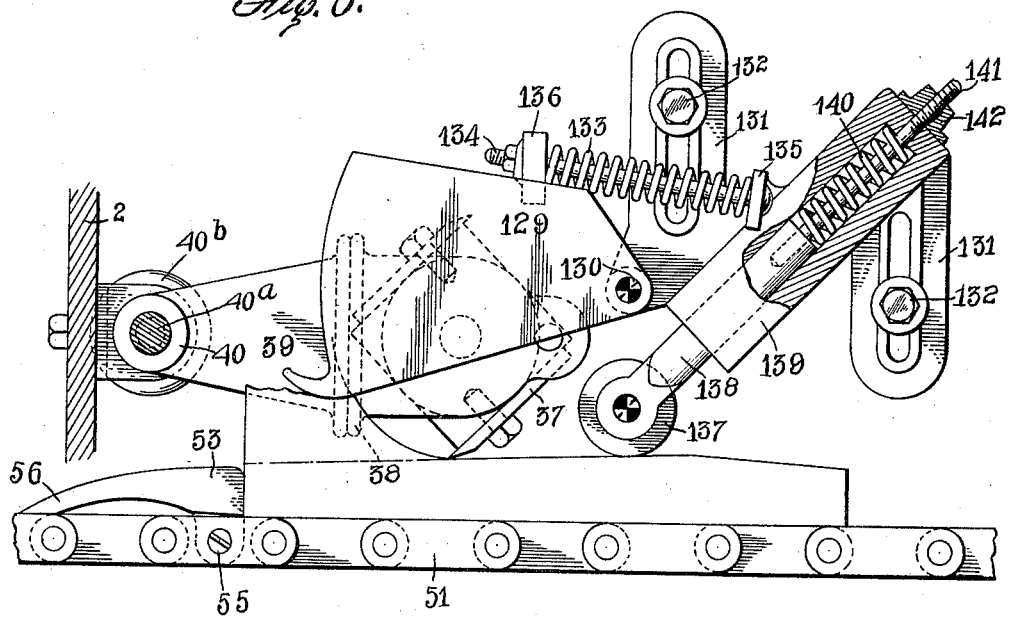
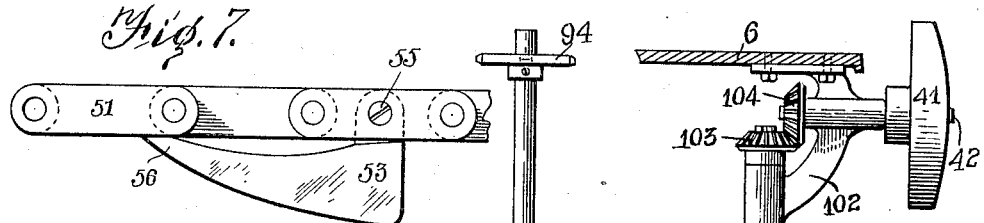
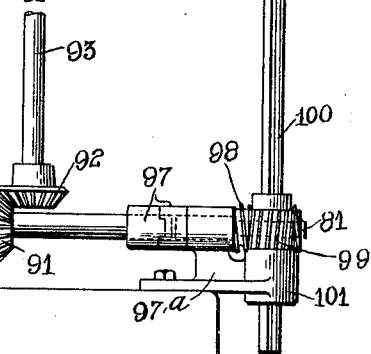

UNITED STATES PATENT OFFICE.

CHARLES W. BORG, OF MOLINE, ILLINOIS.

FEED AND PRESSURE MECHANISM FOR WOODWORKING-MACHINES.

1,038,483. Specification of Letters Patent. Patented Sept. 10, 1912.

Original application filed September 7, 1906, Serial No. 333,707. Divided and this application filed January 23, 1907. Serial No. 353,664.

*To all whom it may concern:*

Be it known that I, CHARLES W. BORG, a citizen of the United States, residing at Moline, in the county of Rock Island and State of Illinois, have invented certain new and useful Improvements in Feed and Pressure Mechanism for Woodworking - Machines, of which the following is a specification, reference being had therein to the accompanying drawing.

This case is a division of my prior application, filed September 7, 1906, Serial Number 333,707, upon which on August 2, 1910, was issued Patent No. 965,983.

The object of my invention is to provide improved feeding- and presser- or holding-down mechanism for wood-working machines; whereby either short blanks or pieces of indefinite length may be finished with equal facility.

In the drawings, Figure 1 is an elevation of the front or operator's side of a form of wood-working machine to which my invention may be applied; Fig. 2 is an elevation of the opposite side of the machine, showing the power-connections and control for both the feed-chain and feed-roll drives; Fig. 3 is a partial plan showing parts at the entering or "feed" end of the machine; Fig. 4 is a partial vertical section taken on the line IV—IV of Fig. 1; Fig. 5 is a perspective detail of the feed-roll mounting and drive; Fig. 6 is an enlarged detail showing the manner of feeding short blanks or work pieces past a laterally-movable or shaping cutter; Fig. 7 is an enlarged detail showing the manner of removably mounting the feed-teeth on the feed-chain, and Fig. 8 is a detail of the main feed-driving shaft and the mechanism for disconnecting the chain feed.

In the drawings, the parts numbered from 1 to 50ᵉ relate to the main framing, table-adjustments, cutter mountings and adjustments, etc., fully described in my application Serial-Number 333,707, above referred to; being herein shown merely to illustrate the application of my feed mechanism; and since such parts form no part of the invention herein claimed, it is not deemed necessary to further describe them.

The machine as a whole is provided with two feed mechanisms, the first consisting of an endless feed chain 51 working in a horizontal plane, its front side passing through a slot in the vertical portion 52 of the feed table, said chain having a plurality of feed teeth 53, 53, which teeth extend through a comparatively-narrow, horizontal slot 54 and project into the path of the blank to be fed. Said feed teeth 53 (shown more clearly in Figs. 6 and 7) are pivoted as at 55 to links of the chain 51 and have rearwardly extending portions 56 adapted to span one or more links on the chain and have a rearward free bearing on other links of said chain. The purpose of this construction is to obviate the forward throw of the tooth 53 which would result as it passes its driving sprocket (hereinafter described) and further to obviate the canting of the link to which it is pivotally attached, and the consequent binding of said link during its passage through the slot in the vertical portion 52 of the feed table. When used to drive the blanks which are to be shaped on their outer or free edge, the feed teeth 53 are so located and driven as to move in timed relation with the lateral movements of the shaping cutter 37, as will hereinafter more fully be described. The second portion of the feed mechanism of the machine comprises a series of feed rolls 57, 57, clearly shown in Figs. 1 and 5, which, when used for driving the blank in conjunction with the feed chain, may be toothed on their peripheries; but which rolls are removably mounted on their driving shafts so that smooth faced rolls may be substituted therefor, which smooth rolls will have a mere pressing or holding down function. Said rolls, whether toothed or plain, are mounted on shafts 58, 58, the free ends of said shafts passing through journals 59, 59 capable of vertical motion in a frame or bracket 60 suitably secured to the upper edge of the side 2 of the main frame. The opposite end of each of the said shafts is rotatably mounted in a bearing member 61 that is supported upon a rod or shaft 62 mounted in brackets 63 that are integral with or suitably attached to the top of the side 3 of the main frame, as clearly shown in Figs. 2 and 5. It will be seen that this construction permits the rotation of the feed roll shafts 58 and at the same time their independent vertical movement at the front or free ends thereof. Said feed rolls are held to their work by the following mechanism: The first feed roll; that is the one acting first on the blank when the latter is fed into the machine, is held down by a rod 64 attached to its box 59 and passing downward through the frame member 2, said rod being pivoted at its lower end to a lever 65, which lever is in turn pivoted as at 66 to the frame member 2, and carries at its free end a weight 67 adjustable thereon for varying the pressure of said roll on the blank. The second and third rolls 57 are in turn held to their work by means of a lever 68 pivoted as at 69 to an upward extension 70 of the bracket 60; said lever 68 having adjustably secured to its outer end a weight 71. Near the pivot 69 of said lever 68 is suitably mounted an equalizing member 72 so arranged that the lever 68 bears thereon, as clearly shown in Fig. 1. Upwardly pivoted to said member 72 are rods 73 which pass downward freely through openings in the bracket 60 and are pivotally attached at their lower ends to the boxes or journals 59 of the second and third rolls. The purpose of this construction is to give to the primary roll 57 a comparatively light pressure upon the blank; as this roll acts upon the blank while its underside is as yet rough and not acted upon by the bottom jointing-cutter 24. After the blank has passed the said bottom jointing-cutter and proceeds over the portion of the table 6 in rear thereof and over the anti-friction roll 22, it may be held to its position on the table 6 with a comparatively greater pressure; which pressure is applied by the longer lever 68 and heavier weight 71.

Passing now to the driving mechanism for said feed chain and feed rolls, this drive is effected by the train of mechanism now to be described. This train receives power from a belt driven by the main countershaft, which belt passes over a pulley 74 (Fig. 2), said pulley being mounted on a stud 75 suitably located in the side 3 of the main frame. Integral with, or suitably attached to the pulley 74 is a pinion 76 which pinion meshes with a gear 77 mounted on a stud 78 also suitably located on the frame member 3. Coaxially mounted on the same stud, and either integral with or secured to the gear 77 is a pinion 79 meshing with a gear 80 keyed or otherwise secured to the main power shaft 81. Said power shaft passes transversely through the main frame of the machine and has secured thereto first a series of sprockets 82, 83, 84. Sprocket 82 is connected by a chain 85 with a sprocket 86 secured to the shaft 58 of the third feed roll 57. In like manner sprocket 83 is connected by a chain 87 with a sprocket 88 secured to the shaft 58 of the middle or second feed roll 57; and sprocket wheel 84 is connected by a chain 89 with a sprocket 90 secured to the shaft 58 of the first or primary feed roll 57. The main power shaft 81 has also secured thereto a bevel-gear 91 (see Fig. 8), said bevel-gear meshing with a second bevel-gear 92 secured to a vertical shaft 93 which passes upwardly through the top of the main frame and carries at its upper end the sprocket 94 which drives the feed chain 51. Said feed chain, at its opposite end, is carried by a toothless flanged roll or carrier 95 suitably mounted on a stud 96 located in an extension of the main frame, as clearly shown in Fig. 1.

The parts 97 to 104, most clearly shown in Fig. 8, are fully described and claimed in my above mentioned application, Serial Number 333,707, and need not be further referred to herein.

The gear train which drives the main feed shaft 81 is provided with a suitable shield 105 and the belt which actuates said feed train may be controlled by idlers 106, 106, mounted on a T-shaped lever or carrier 107, which carrier is pivoted on a stud 108 suitably mounted on the main frame. The third arm of the carrier 107, is connected by a link or rod 109 to a lever 110 pivoted as at 111 to the box side 3 of the main frame and extending upwardly within reach of the operator where it is provided with an operating handle 112 for controlling the belt tightening pulleys 106, as will be readily understood. This lever 110 and the link 109 are so mounted and proportioned that when the aforesaid lever is swung to one side of its pivot 111 its weight will tend to hold the tighteners 106 in contact with the driving belt; and when swung to the opposite side it will tend to hold said tighteners out of contact with the driving belt and stop the entire feed train of the machine.

In the use of the heavily weighted presser bars and chip-breakers, it has been found very difficult to lift such devices to their working position by merely feeding the blank beneath a beveled portion of such device; on account of the great resistance offered to the forward feed of the blank. I obviate this difficulty by providing a construction in which one of the feed-rolls, (preferably the last), acts to raise the chip-breaker or other member to nearly its working height. As shown in Fig. 1, the construction comprises a member 124, pivoted as at 125 to the journal boxes 30 of the cutter 29, and arching over said cutter; its free end resting on an extension of the box 59 of the third feed roll 57; so that the free end of said chip breaker will be raised to nearly its working position by the rising of the third feed roll 57 and not by the direct contact of the work-piece therewith. The extension of said third roll journal which carries the chip breaker is indicated at 126. Adjustable holding down pressure is applied to the chip breaker by means of the lever 127 and movable weight 128.

Operation: For planing, jointing or

"sticking" straight work, it will be readily understood that the feed-chain drive may be disconnected by moving the bevel gear 91 out of contact with gear 92 and the feed teeth (or so many thereof as is necessary) may be removed from the feed chain to leave clear the path of the blank which may then be driven solely by the toothed feed rolls 57; or, if preferred, both the rolls and feed chain may be used for feeding short pieces of straight work. The shaping cutter 27 may remain in contact with the outer side of the blank so as to merely dress it in straight lines, or may be thrown altogether out of contact with the outer edge of the work.

It will be understood that changes may be made by the skilled mechanic without departing from my invention; since

What I claim is:—

1. In a wood-working machine, in combination, a feed-chain adapted to move wholly without the path of travel of a blank and having removable blank-driving members projecting into said path and power-driven feed-rolls adapted to engage a blank simultaneously with the blank-driving members or to feed the blank when the blank-driving members are removed from the chain.

2. In a wood-working machine, in combination, a feed table adapted to receive long pieces of stock, power-driven feed-rolls, a power-driven feed-chain mounted without the path of travel of the work and having removable members adapted to feed short blanks in coöperation with the feed-rolls, and means for disconnecting the chain-driving mechanism when the removable members are detached, to permit the unobstructed feed of long stock by the feed-rolls only.

3. In a wood working machine, in combination, a power driven feed chain having removable blank feeding members, the feed chain being mounted without the path of travel of the work, and an upwardly yieldable presser-roll mechanism adjustable to serve either as a mere presser device on account of the presentation of a smooth roll surface for engagement with a blank, or as a combined feed and presser device on account of the presentation of a corrugated roll surface for engagement with a blank.

In testimony whereof I affix my signature, in presence of two witnesses.

CHARLES W. BORG.

Witnesses:
MARSHALL BECK,
AUGUST NELSON.

---

Copies of this patent may be obtained for five cents each, by addressing the "Commissioner of Patents, Washington, D. C."